July 24, 1951     E. W. DAVIS     2,561,785
LUBRICATING APPARATUS
Filed June 15, 1945     4 Sheets—Sheet 1
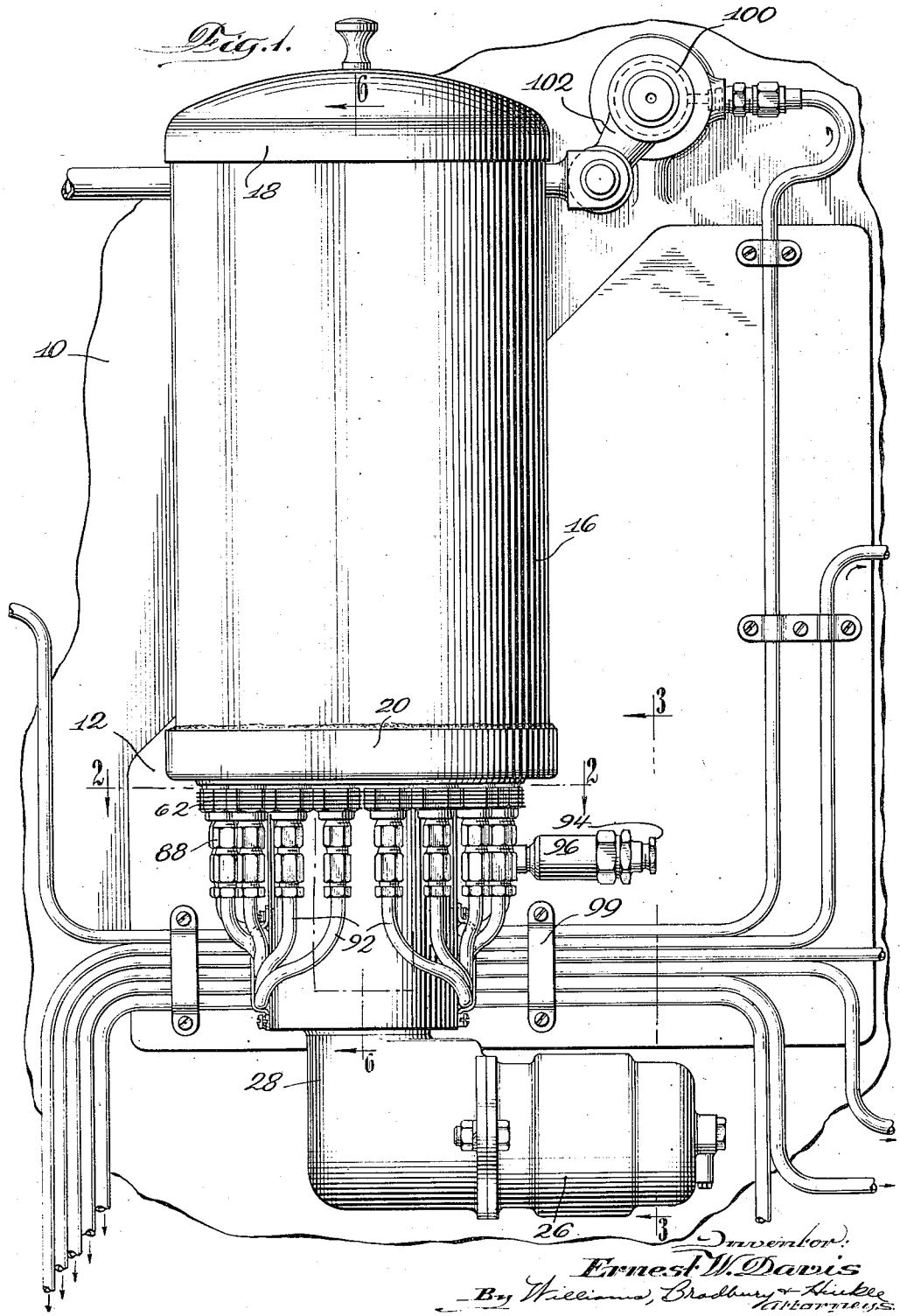

July 24, 1951 E. W. DAVIS 2,561,785
LUBRICATING APPARATUS
Filed June 15, 1945 4 Sheets-Sheet 2
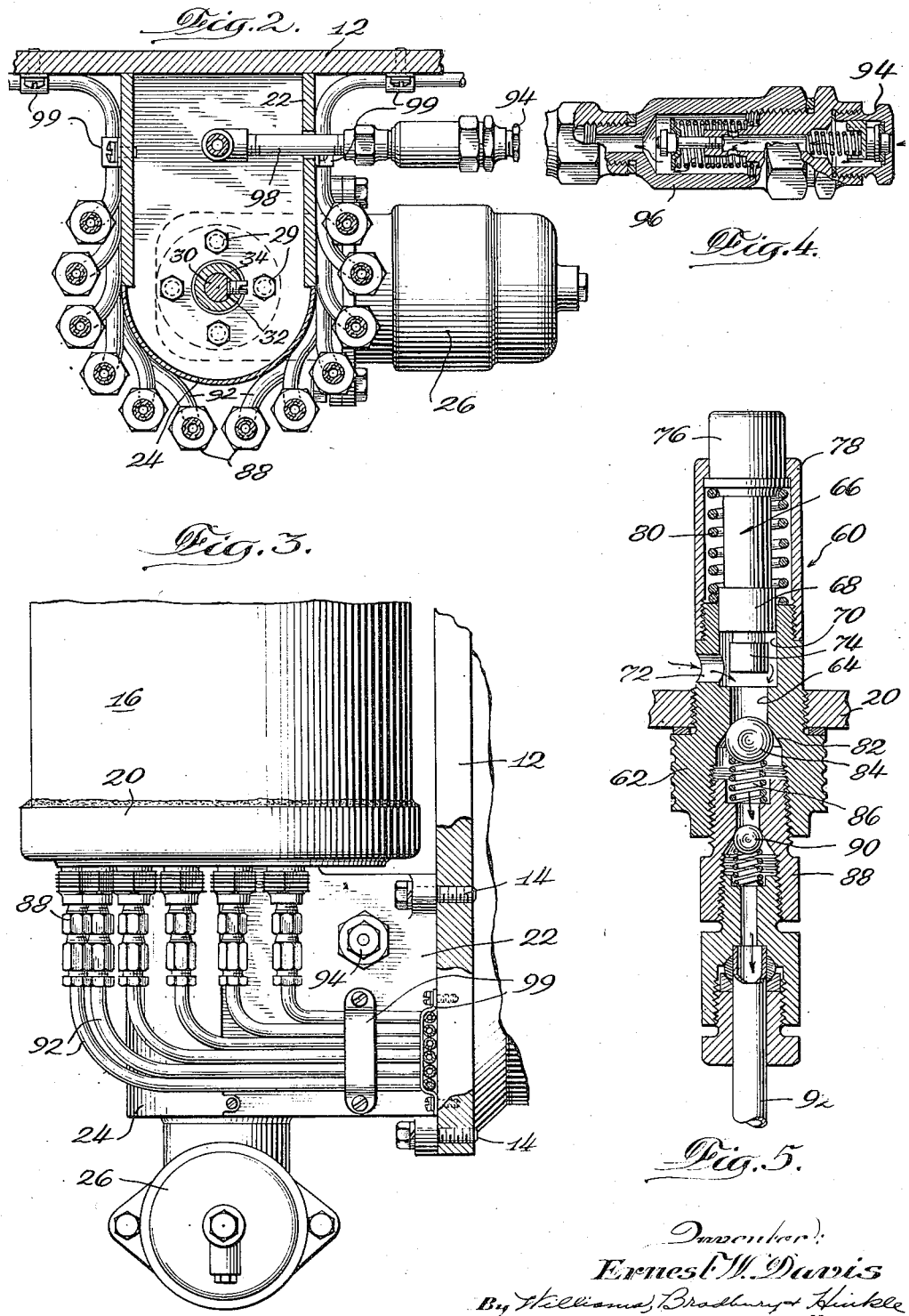
Inventor:
Ernest W. Davis
By Williams, Bradbury & Hinkle
attorneys July 24, 1951 E. W. DAVIS 2,561,785
LUBRICATING APPARATUS
Filed June 15, 1945 4 Sheets-Sheet 3

Inventor:
Ernest W. Davis
By Williams, Bradbury & Huckle
Attorneys

Patented July 24, 1951

2,561,785

UNITED STATES PATENT OFFICE 2,561,785

LUBRICATING APPARATUS

Ernest W. Davis, River Forest, Ill.

Application June 15, 1945, Serial No. 599,665

5 Claims. (Cl. 184—27)

My invention relates generally to lubricating apparatus, and more particularly to a multiple grease pump lubricating system.

It is an object of the invention to provide an improved apparatus for the lubrication of a plurality of bearings of a machine.

A further object is to provide an improved lubricant compressor having a plurality of pumping cylinders and common means for feeding a lubricant, such as grease, to the pumps.

A further object is to provide an improved reservoir for grease, having means to feed the grease downwardly to prime the pumps.

A further object is to provide a multiple unit grease pumping apparatus having common means for actuating the pumps seriatim.

A further object is to provide an improved multiple grease pump in which the individual pumps may easily be removed and replaced.

Other objects will appear from the following description, reference being had to the accompanying drawings, in which:

Fig. 1 is an elevational view of the lubricant compressor shown attached to a part of a machine to be lubricated;

Fig. 2 is a horizontal sectional view taken on the line 2—2 of Fig. 1;

Fig. 3 is a fragmentary side elevational view taken on the line 3—3 of Fig. 1;

Fig. 4 is a fragmentary sectional view of the inlet fitting and strainer;

Fig. 5 is a central vertical sectional view of one of the grease pumps;

Figure 6:
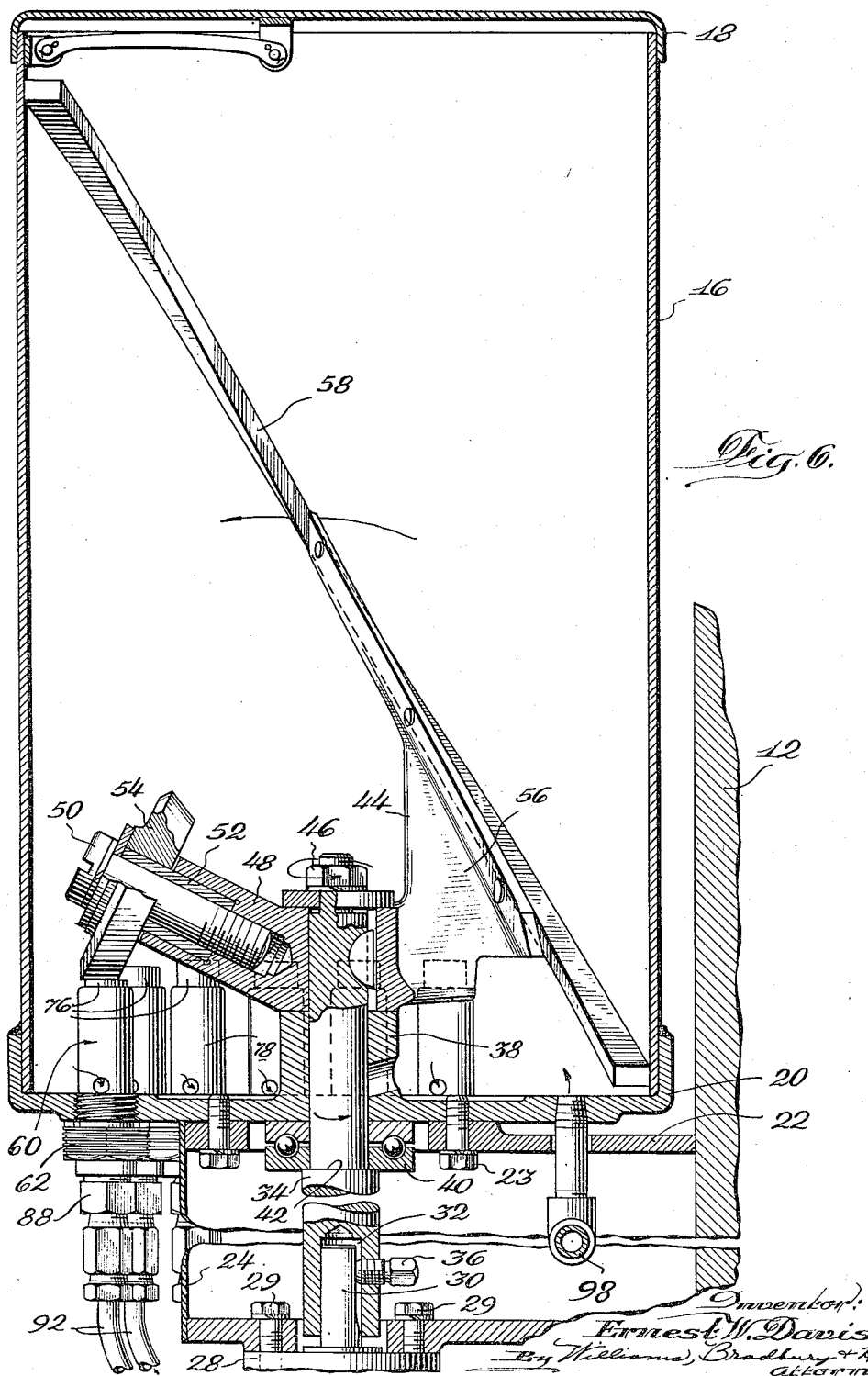
Fig. 6 is a central vertical sectional view taken on the line 6—6 of Fig. 1.

The lubricating apparatus is illustrated as applied to the lubrication of a power operated machine 10 fragmentarily illustrated in Fig. 1, being attached to a boss 12 thereof as by cap screws 14 (Fig. 3).

The pumping mechanism comprises a reservoir 16 having a hinged cover 18 and a bottom 20. The reservoir is attached to a mounting bracket or base 22 which is preferably a hollow casting, the front end of which is closed by a removable semi-cylindrical plate 24. A motor 26 and speed reducing gear box 28 are secured to the bottom of the bracket 22 by cap screws 29, the speed reducing gearing terminating in a drive shaft 30. The end of the drive shaft 30 is of D-shaped cross section and fits in a socket 32 formed in the lower end of a shaft 34, being held by a set screw 36. The shaft 34 is rotatable in a bearing boss 38 formed integrally with the bottom 20. An antifriction thrust bearing assembly 40 is positioned between a shoulder 42 formed on the shaft 30 and the bottom 20.

A casting 44 is keyed to the upper end of the shaft 34 and is secured thereto by a nut 46 threaded on the end of the shaft, suitable washers being interposed between the nut and the casting 44. An arm 48 of the casting 44 is tapped to receive a cap screw 50 which holds a bearing bushing 52 for a frusto-conically faced roller 54. The other arm 56 of the casting 44 is shaped as an inclined vane to press grease downwardly and its end is formed for attachment to a helical wiping blade 58. This blade is so conformed that its edge wipes along the cylindrical surface of the grease reservoir 16, with the result that as the shaft 34 rotates in the direction indicated by the arrows, the blade 58 will tend to force the grease downwardly along the inner surface of the reservoir so as to prime lubricant pumps 60.

There are twelve pumps 60 arranged in an arcuate row concentric with the shaft 34. Each of these pumps is constructed as shown in Fig. 5. The pump comprises a body 62 having a cylindrical bore 64. A plunger 66 has a portion 68 of increased diameter which is guided in a bore 70 formed in the body 62, the bore 70 being provided with an inlet port 72. The lower end of the plunger 66 terminates in a piston portion 74 which is accurately fitted to the bore 64. The length of the piston portion 74 determines the displacement of the pump. By having these of different lengths, or by otherwise changing the effective stroke of the pump, the displacement of each pump may be made to correspond to the lubricant requirements of the bearing to which the pump is connected.

The plunger 66 has a flanged head 76 which is guided by a sleeve 78 threaded to the upper end of the body 62. A coil spring 80 is compressed between the flange of the plunger head 76 and the upper end of the body 62, and thus normally holds the plunger in its retracted position as shown in Fig. 5. The lower end of the bore 64 has a conical shoulder 82 forming a seat for an outlet ball check valve 84, the valve being held against its seat by a compressed spring 86.

A check valve fitting 88 is threaded in the lower end of the body 62 and includes a spring pressed ball check valve 90. A tube 92 for conveying the grease to the part of the machine to be lubricated is suitably secured to the check valve fitting 88.

The reservoir 16 may be filled by removing the cover 18 and ladling the grease into it, but it is preferable, in order to avoid contamination of the grease, to pump it into the reservoir 16 directly from the drum in which the grease is shipped. To this end there is provided a lubricant receiving fitting 94 to which may be coupled the discharge hose of the pump used to empty the drum. The fitting 94 is threaded in a strainer housing 96 and the latter is threaded to a pipe 98 which is suitably connected to the bottom 20 so as to deliver the grease into the reservoir 16. It will be noted that the tubes 92 from the pumps 60 at one side of the lubricator are secured to the bracket 22 and plate 12 by clamps 99. These tubes lead to the parts of the machine to be lubricated, such, for example, as the bearing 100 (Fig. 1) for a rocker arm 102 forming part of the machine.

It will be noted that the pumps 60 are located beyond the bracket 22 so that any one of these pumps may be removed merely by disconnecting its discharge tube and unscrewing it from the bottom 20. Thus any of the pumps may be replaced by another having a different displacement. Also, the arrangement is such that the plate 24 may be removed and access had to the cap screws 23 and 29 and to the set screw 36 and pipe 98 in the event that this is found necessary in servicing the apparatus.

Figure 7:
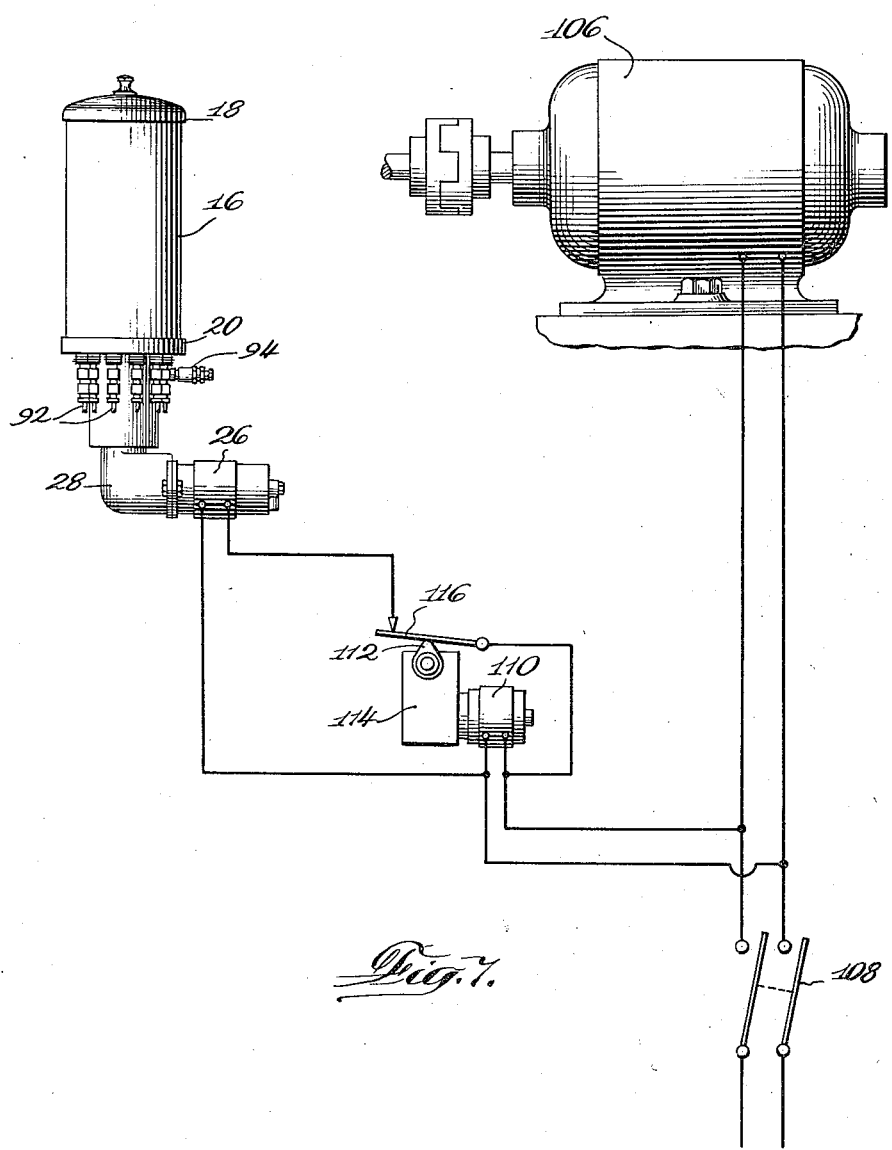
Fig. 7 is a diagrammatic view of the electrical control circuits for the apparatus.

In Fig. 7 there is shown a typical circuit diagram for the lubricating system. Power for the operation of the motor 106 of the machine is supplied upon closure of main switch 108. A timing motor 110 is connected in parallel with the machine motor 106, the timing motor preferably being a small synchronous motor driving a cam 112 through a suitable speed reducing gearing contained in a housing 114. The cam 112 periodically closes a switch 116 to complete a circuit to the lubricator motor 26. Instead of utilizing a timing motor, in some installations it may be preferable to operate the switch 116 from some part of the machine driven by the motor 106.

From Fig. 7, it will be apparent that the lubricator motor 26 is periodically energized during the time that the machine upon which the system is installed is in operation.

The motor 26 drives the shaft 34 at a relatively slow speed, in the order of 8 or 10 R. P. M. The roller 54 successively engages the heads 76 of the pumps and depresses them to cause the piston portions 74 thereof to discharge the lubricant contained in their cylinders 64. Inasmuch as the plungers are operated rather slowly, it is of importance to have a very close fit between the piston portion 74 and the cylinder 64. As the roller 54 rolls past the heads 76 the springs 80 will retract the plungers 66 and draw fresh charges of grease into the cylinders 64 and bores 70.

The portion 68 of the plunger 66, during the initial portion of the downward movement of the plunger, tends to force the grease contained within the bore 70 into the cylinder 64 in the event that the grease, due to its high viscosity, failed to fill the cylinder 64 upon retraction of the piston 74.

As the shaft 34 rotates, the blade 53 scrapes along the inner wall of the reservoir 16 and forces the lubricant downwardly toward the inlet ports 72 of the various pumps, so as to facilitate priming them and to prevent cavitation of the grease in the reservoir. The bracket arm or vane 56 similarly aids in compacting the grease at the bottom of the reservoir and removing entrapped air therefrom.

While I have shown and described a preferred embodiment of my invention, it will be apparent that numerous variations and modifications thereof may be made without departing from the underlying principles of the invention, and the invention is therefore to be understood as including all variations, modifications and equivalents which may come within the scope of the appended claims.

I claim:

1. In a lubricator, the combination of a generally cylindrical reservoir, a plurality of reciprocating pumps each having a cylinder and a spring-returned plunger therein, means for threading said cylinders into the bottom of the reservoir from the outside thereof with inlet openings within the cylinders exposed within the reservoir and with the plungers having exposed ends within the reservoir, a shaft extending through the bottom of the reservoir in a direction parallel to the axes of the pumps, power means to rotate said shaft, a pair of arms secured to said shaft within the reservoir adjacent the bottom thereof, a roller rotary mounted at the outer end of one of said arms and operatively engageable with the ends of the pump plungers, and vane means carried by the other arm formed to cause flow of lubricant toward the pumps as the shaft rotates.

2. In a lubricator having a hollow bracket, a reservoir mounted upon said bracket, a plurality of pumps connected to a portion of the bottom of the reservoir which extends beyond the bracket, said pumps being operative for withdrawing measured charges of lubricant from the reservoir and discharging the lubricant to parts to be lubricated, a discharge conduit connected to each of said pumps, power means to operate said pumps successively including a driving member within the hollow bracket and extending through the bottom of the reservoir, and means for securing said discharge conduits to the outer surface of said bracket.

3. In a lubricator, the combination of a cylindrical reservoir, a shaft in said reservoir, power means for rotating said shaft, a plurality of pumps at the bottom of the reservoir arranged in an arcuate row around the axis of said shaft, each of said pumps comprising a cylinder, a plunger reciprocable in the cylinder, a spring urging said plunger out of the cylinder, means to force said plungers successively into their cylinders comprising an arm secured to said shaft and a roller mounted on said arm and operatively engageable successively with the ends of the plungers as the shaft is rotated, and a helically shaped blade secured to said arm and having its lower end extending into the annular space between the arcuate row of pump cylinders and the inner wall of the reservoir, whereby the edge of said blade will scrape lubricant downwardly from the reservoir wall toward the pumps as said shaft is rotated.

4. In a lubricator, a supporting bracket, a reservoir secured to said bracket, a plurality of reciprocating pumps arranged in an arcuate row and having the discharge ends thereof extending through the bottom of the reservoir, a rotatable shaft extending through the bottom of the reservoir centrally with respect to said row of pumps, means carried by said shaft inside the reservoir to operate the pumps successively, a generally helical scraper blade adapted to engage the inner cylindrical surface of the reservoir to scrape lubricant therefrom and advance it toward the pumps, and an inclined vane of substantial area forming an arm rigidly connecting the scraper blade intermediate its ends over a substantial portion of its length to the shaft, said vane cooperating with said blade to force lubricant downwardly as the shaft rotates.

5. In a lubricator the combination of a generally cylindrical reservoir, a plurality of pumps extending upwardly from the bottom of said reservoir in an arcuate row concentric with the inner wall of said reservoir and relatively closely spaced to said wall, said pumps having an inlet adjacent the bottom of the reservoir, a shaft extending through the bottom of said reservoir, power means for rotating said shaft, pump actuating means rotated by said shaft for successively operating said pumps, a vane operated by said shaft and adapted to advance lubricant toward said pumps, and a blade secured to said vane and having a lower end part which moves in the annular space between said pumps and the inner wall of said reservoir to urge lubricant toward the inlets to said pumps.

ERNEST W. DAVIS.

REFERENCES CITED

The following references are of record in the file of this patent:

UNITED STATES PATENTS

| Number | Name | Date |
|---|---|---|
| 831,890 | Plane et al. | Sept. 25, 1906 |
| 989,694 | Charter | Apr. 18, 1911 |
| 1,078,889 | Woerner | Nov. 18, 1913 |
| 1,374,315 | Murphy | Apr. 12, 1921 |
| 1,820,266 | Bilderback | Aug. 25, 1931 |
| 1,933,809 | Jullig | Nov. 7, 1933 |
| 1,937,032 | Schlosshauser | Nov. 28, 1933 |
| 1,952,746 | DeLong | Mar. 27, 1934 |
| 1,980,984 | Davis | Nov. 20, 1934 |
| 2,312,304 | Anderson | Mar. 2, 1943 |

FOREIGN PATENTS

| Number | Country | Date |
|---|---|---|
| 285,346 | Great Britain | Feb. 16, 1928 |
| 563,578 | Germany | Nov. 7, 1932 |